United States Patent [19]

Nachtman et al.

[11] Patent Number: 5,849,364
[45] Date of Patent: Dec. 15, 1998

[54] SELF-FOAMING SPRAYABLE COMPOSITION

[75] Inventors: Thomas J. Nachtman, Temperance, Mich.; John H. Hull, Toledo, Ohio

[73] Assignee: New Waste Concepts, Inc., Perrysburg, OH

[21] Appl. No.: 892,144

[22] Filed: Jul. 14, 1997

Related U.S. Application Data

[63] Continuation of Ser. No. 645,254, May 13, 1996, abandoned, which is a continuation-in-part of Ser. No. 113,506, Aug. 27, 1993, Pat. No. 5,516,830, and Ser. No. 353,954, Dec. 12, 1994, Pat. No. 5,556,033, which is a continuation-in-part of Ser. No. 823,186, Jan. 21, 1992, abandoned, said Ser. No. 113,506, is a continuation of Ser. No. 823,186, which is a continuation of Ser. No. 639,285, Jan. 10, 1991, Pat. No. 5,082,500, which is a continuation-in-part of Ser. No. 350,599, May 10, 1989, abandoned.

[51] Int. Cl.$^6$ ................................. B05D 1/02; C08L 1/08
[52] U.S. Cl. ......................... 427/421; 427/212; 427/221; 106/170; 106/203; 106/204; 106/900; 44/602; 252/88.1
[58] Field of Search ..................................... 427/212, 221, 427/421; 106/203, 204, 170, 900; 44/602; 252/88.1

[56] References Cited

U.S. PATENT DOCUMENTS

| | | |
|---|---|---|
| 2,598,981 | 6/1952 | Denning . |
| 2,649,333 | 8/1953 | Miller . |
| 2,802,303 | 8/1957 | Weeks . |
| 2,961,799 | 11/1960 | Coe . |
| 2,993,016 | 7/1961 | Sucetti . |
| 3,147,128 | 9/1964 | Harrell . |
| 3,238,155 | 3/1966 | Harrell et al. . |
| 3,464,626 | 9/1969 | Stamps et al. . |
| 3,466,873 | 9/1969 | Present . |
| 3,522,069 | 7/1970 | Checko et al. . |
| 3,600,852 | 8/1971 | Burke . |
| 3,635,742 | 1/1972 | Fujimasu . |
| 3,640,461 | 2/1972 | Koll . |
| 3,763,072 | 10/1973 | Krieger . |
| 3,772,893 | 11/1973 | Eilers . |
| 3,812,615 | 5/1974 | Jamison . |
| 3,848,802 | 11/1974 | Degginger et al. . |
| 3,867,124 | 2/1975 | Church . |
| 3,895,956 | 7/1975 | Yoshida et al. . |
| 3,986,365 | 10/1976 | Hughes . |
| 3,997,484 | 12/1976 | Weaver et al. . |
| 4,028,130 | 6/1977 | Webster et al. . |
| 4,076,862 | 2/1978 | Kobeski et al. . |
| 4,232,480 | 11/1980 | Videen . |
| 4,297,810 | 11/1981 | Hansford . |
| 4,354,876 | 10/1982 | Webster . |
| 4,369,054 | 1/1983 | Shinholster, Jr. et al. . |
| 4,369,597 | 1/1983 | Leep et al. . |
| 4,374,672 | 2/1983 | Funston et al. . |
| 4,414,776 | 11/1983 | Ball . |
| 4,421,788 | 12/1983 | Kramer . |
| 4,432,666 | 2/1984 | Frey et al. . |
| 4,519,338 | 5/1985 | Kramer et al. . |
| 4,600,744 | 7/1986 | Libor et al. . |
| 4,610,311 | 9/1986 | Bronner et al. ........................ 252/88.1 |
| 4,721,245 | 1/1988 | van Zweeden . |
| 4,723,710 | 2/1988 | Lucore, II . |
| 4,787,928 | 11/1988 | Balassa . |
| 4,816,220 | 3/1989 | Roychowdhury . |
| 4,836,945 | 6/1989 | Kestner ................................. 252/88.1 |
| 4,897,218 | 1/1990 | Roe ....................................... 252/88.1 |
| 4,909,667 | 3/1990 | DeMello . |
| 4,927,317 | 5/1990 | Acosta . |
| 4,950,426 | 8/1990 | Markowitz et al. . |
| 4,973,196 | 11/1990 | Fuhr et al. . |
| 5,040,920 | 8/1991 | Forrester . |
| 5,054,406 | 10/1991 | Judd . |
| 5,082,500 | 1/1992 | Nachtman et al. . |
| 5,161,915 | 11/1992 | Hansen . |
| 5,201,473 | 4/1993 | Pollock . |
| 5,275,508 | 1/1994 | Hansen . |
| 5,385,429 | 1/1995 | Hansen . |
| 5,516,830 | 5/1996 | Nachtman et al. . |
| 5,556,033 | 9/1996 | Nachtman . |
| 5,612,385 | 3/1997 | Ceaser et al. . |

FOREIGN PATENT DOCUMENTS

| | | |
|---|---|---|
| 0 033 997 | 8/1981 | European Pat. Off. . |
| 0 052 686 | 6/1982 | European Pat. Off. . |
| 52038025 | 3/1977 | Japan . |
| WO 88/06598 | 9/1988 | WIPO . |
| WO 94/15886 | 7/1994 | WIPO . |

OTHER PUBLICATIONS

On April 13, 1994, a self–foaming sprayable composition was sold. The composition differed from the composition defined in new claims 41, 51 and 56 in not including a glue.
"Natrosol" Brochure from Hercules Inc., 1990 No month.
"Imvitone Organoclays & Clay Products" Brochure from IMV, 1990 No month.
Chemical Abstracts, vol. 109, No. 20, abstract No. 175450t p. 320.
"Finn Hydro–Stik", Bulletin No. 113, Finn Corporation, 1988.
"Soil Seal Concentrate", Soil Seal Corporation, Dec. 1984.
"Airtrol Plaster", U.S. Gypsum Company, 1992 16–306 Jan. 1992.
"Airtrol Inorganic Geobinder", U.S. Gypsum Company, 1995 16–306 rev. Feb. 1995.
Topcoat, Daily Landfioll Cover, Central Fiber Corporation, 1995 no other info available.

*Primary Examiner*—Shrive Beck
*Assistant Examiner*—Bret Chen
*Attorney, Agent, or Firm*—MacMillan, Sobanski & Todd, LLC

[57] ABSTRACT

A self-foaming composition includes a foaming agent, a bulking material, and a water soluble polymer. The composition, when mixed with an aqueous carrier, forms a foamed sprayable composition suitable for providing a cover layer over a selected material.

20 Claims, No Drawings

SELF-FOAMING SPRAYABLE COMPOSITION

CROSS REFERENCE TO RELATED APPLICATIONS

This application is a continuation of U.S. application Ser. No. 08/645,254, filed May 13, 1996, now abandoned, which is a continuation-in-part of both U.S. application Ser. No. 08/113,506, filed Aug. 27, 1993, now U.S. Pat. No. 5,516,830 and U.S. application Ser. No. 08/353,954, filed Dec. 12, 1994, now U.S. Pat. No. 5,566,033 which, respectively, are a continuation and a continuation-in-part of U.S. application Ser. No. 07/823,186, filed Jan. 21, 1992, now abandoned, which is a continuation of U.S. application Ser. No. 07/639,285 filed Jan. 10, 1991, now U.S. Pat. No. 5,082,500, which is a continuation-in-part of U.S. application Ser. No. 07/350,599, filed May 10, 1989, now abandoned.

BACKGROUND OF THE INVENTION

The present invention relates in general to a self-foaming sprayable composition. In particular, the invention relates to a self-foaming composition suitable for spraying to cover a material to be protected such as waste materials at a disposal site, materials at a mining site, a remediation site, a soil surface, or materials in a stockpile. The composition forms a protective water-resistant layer over the covered material.

Waste materials such as garbage and trash are commonly disposed of at landfill sites throughout the country. The waste materials are concentrated into large piles at the landfills. Ore leaching piles and spoil piles for mine spoils or tailings are common at mining sites throughout the country. The operation of the landfills and mining sites presents numerous problems. For example, wind can blow litter, spoils, dust and other particulate matter from the piles and scatter it throughout the landfill or mining site and into the surrounding areas. The materials in the piles can emit unpleasant odors, air-polluting volatile organic compounds ("VOC's") such as methane, non-methanogenic organic compounds, carbon dioxide, and hazardous air pollutants. Under the Clean Air Act, the landfill or mining operator is required to control these emissions if they exceed certain levels. Pests such as scavenging birds, rodents and flies can gather at the landfill site, creating a nuisance and possibly spreading diseases. Some of the materials may be combustible so that fires can occur.

In an attempt to address some of these problems, waste piles at landfill sites are often covered by a compacted layer of dirt, often termed a "daily cover" or "intermediate cover". Unfortunately, the task of placing and compacting the dirt can represent a significant portion of the landfill operating cost since it employs significant labor and heavy equipment. Each day's garbage or trash must be covered at the end of the day with a new dirt layer. Also, depending on the soil type, the dirt layer is not always very effective in controlling the emission of VOC's.

Besides the cost of applying the compacted dirt cover, it is recognized that multiple dirt fill layers used in this way can consume a significant volume of the valuable landfill space which might otherwise be used for disposal. Many areas are rapidly exhausting their available landfill acreage, and consequently reducing the consumption rate of the available landfill volume is highly desirable.

One alternative to a compacted dirt cover is disclosed in U.S. Pat. Nos. 4,909,667 and 4,927,317, wherein a canvas or plastic sheet is daily retracted and extended to protect the working face of the landfill. The sheet cover can be impractical for large landfills, mechanical breakdowns can occur during retraction/extension of the sheet, and limitations of use can occur during inclement weather. Removal of the sheet cover on a daily basis can release clouds of air emissions. The sheet cover can be comprised of flammable or combustible materials.

Another alternative to a compacted dirt cover is described in U.S. Pat. Nos. 4,421,788 and 4,519,338 in which the landfill surface is coated with a plastic foam spray. Unfortunately, the plastic foam is non-biodegradable and can have an unattractive appearance. It must be sprayed relatively close to the working face of the landfill, which can present safety problems for the workers.

Thus, it would be desirable to provide a composition suitable for providing a protective cover layer over waste materials, as an alternative to the use of a compacted dirt layer. It would also be desirable if the composition was useful as a cover for other materials such as spoil piles at a mining site, a remediation site, or a soil surface. It would further be desirable if the composition was sprayable so that it was easily applied to cover the materials. Further, it would be advantageous if the composition could be foamed to provide an effective cover at reduced cost. However, the use of foam generating equipment can sometimes be a cumbersome and time consuming process as a result of human errors and problems of adjusting and monitoring necessary foaming equipment. Also, foam generating equipment requires compressed air to create the foam. Therefore, it would be advantageous if the composition was self-foaming so that it could be applied without the need for foam generating equipment.

SUMMARY OF THE INVENTION

The present invention provides a self-foaming sprayable composition for forming a cover layer over material to be protected such as (1) refuse such as trash and garbage at a landfill site, (2) hazardous waste material at a hazardous waste site, (3) spoil piles or leaching piles at a mining site, (4) a remediation site, (5) a soil surface, (6) a stockpile of material such as grain, ash pits, salt or coal, or (7) tire piles (which may optionally be covered with a netting material before spraying the composition to enhance the structural integrity of the cover).

The composition includes the following ingredients:
 (a) a foaming agent;
 (b) a bulking material which can include clay minerals and/or a bulking/setting material such as gypsum; and
 (c) one or more water soluble polymers, such as a cellulosic polymer.

The composition can also include a fibrous material, such as paper, wood, plastic or glass fiber, which functions as a filler and a binder for a matrix formed by the polymer.

The ingredients are combined with a carrier such as water to form a foamed slurry which is sprayed or spread by other means over the material to be protected. The composition, when applied, forms a protective, water-resistant cover layer over material, which has been found to last up to six months to a year, depending upon the ambient weather conditions. When used to cover waste materials at a landfill site, the composition tacks down dust or papers that are blown unwantedly by wind, reduces volatile emissions and controls odor.

It has been found that by including the right type and amount of foaming agent with the ingredients of the dry mix for making the composition, a consistently good foamed composition can be produced without the need for a foam generator. Foaming lowers the cost of the composition to cover a given area without causing a loss of cover effectiveness. The foaming agent also improves the adhesive properties of the composition, promotes the formation of a thick and uniform cover layer, and increases the solubility of the other ingredients in the composition.

Other advantages of the present invention will be apparent to one skilled in the art from reading the following description of the preferred embodiment.

DETAILED DESCRIPTION OF THE INVENTION

Referring now to the following Table 1, there is provided a listing of ingredients included in a self-foaming sprayable composition for forming a cover according to the invention. The ingredients are given in pounds per 100 gallons of water. The batch size can be adjusted as desired for a particular application.

TABLE 1

| Ingredient | Quantity |
| --- | --- |
| Foaming Agent | at least 0.3 pounds |
| Bulking Material | 30–1300 pounds |
| Water Soluble Polymer | 0.5–20 pounds |
| Water | 100 gallons |

A preferred formulation of the self-foaming sprayable composition includes the ingredients shown in the following Table 2.

TABLE 2

| Ingredient | Quantity |
| --- | --- |
| Foaming Agent | 0.45–0.9 pounds |
| Bulking Material | 30–350 pounds |
| Water Soluble Polymer | 0.5–15 pounds |
| Water | 100 gallons |

The ingredients of the composition are usually in the form of a dry mix before combining with water. In accordance with this invention, a foaming agent is included with the dry mix ingredients. The ingredients are then mixed with water to form an aqueous slurry for a sprayed application. It has been found that by including the right type and amount of foaming agent with the ingredients of the dry mix, a consistently good foamed composition can be produced without the need for a foam generator. In addition, the inclusion of a foaming agent with the dry mix provides advantages over adding a liquid foaming agent to an aqueous slurry. Foaming according to this invention is a simple and economical one-step process, in which the dry ingredients are self-foaming when mixed with water in a mixing tank. In contrast, a two-step process is required for making a slurry of ingredients with water in a mixing tank, and then mixing a liquid foaming agent into the slurry. Also, it is believed that a more stable foam can be produced according to this invention.

When the ingredients are mixed with water to form a slurry, the foaming agent functions to expand the slurry by entraining air therein. The resulting foamed slurry has an increased volume and a reduced density. Foaming lowers the cost of the composition to cover a given area without causing a loss of cover effectiveness. The foaming agent also improves the adhesive properties of the composition and bridges gaps on the area to be covered, promotes the formation of a thick and uniform cover layer, and increases the solubility of the other ingredients in the composition. In particular, the foaming agent helps the water soluble polymer to hydrate and expand much more rapidly. Further, the foaming agent also increases the effectiveness of a chemical bird aversion agent which may be included in the composition.

Research was conducted to determine a foaming agent suitable for including with the dry ingredients of the composition of this invention, for producing a stable foam having the desired properties. It has been found that surfactants having a high hydrophilic/lipophilic balance ("HLB") are very effective for use as foaming, agents of the invention. The surfactant should have an HLB of at least about 11.0, and preferably from about 11.0 to about 13.0. If the HLB is too high the composition foams out of the mixing tank before it can be mixed thoroughly to a good consistency, and the resulting applied foamed composition is of insufficient strength to maintain an effective cover.

The concentration of surfactant in the composition is important for providing a suitable foam. The surfactant is used in an amount of at least about 0.3 pounds per 100 gallons of water, preferably from about 0.45 to 0.9 pounds, and more preferably from about 0.6 to about 0.9 pounds. If a lower concentration of surfactant is used, the foam is fragile and may collapse prematurely before it is applied. Preferably the amount of surfactant is at least about 0.15% by weight of the total ingredients in the composition, more preferably at least about 0.2%, and most preferably from about 0.2% to 0.3%. These amounts and percentages are calculated on the basis of 100% activity of the surfactant (if the surfactant has a lower activity, the amount used will be correspondingly higher).

Preferably the surfactant has an activity of at least about 50%, and more preferably at least about 70%, to ensure good foaming and consistency of the surfactant composition. In general, preferred surfactants are highly biodegradable and non-toxic, and do not tend to absorb or leach metals.

Preferably the foaming agent is in the form of a powder. A particularly preferred foaming agent is Nacconal 90G, a 90% active linear alkyl benzene sulfonate surfactant in powder form available from Stepan Chemical Company. This surfactant has an HLB of about 11.5 and provides excellent foaming.

Other suitable surfactants can be chosen from anionic, cationic, nonionic and amphoteric surfactants known to persons skilled in the art. Suitable anionic surfactants may include linear alkyl sulfonates, sodium or potassium oleates, such as sodium lauryl oleate, silicone surfactants, and fluorinated surfactants. Suitable nonionic surfactants may include ethylene oxide condensates such as nonyl phenols and octyl phenols. In general, surfactants having short alkyl groups tend to be high foaming, while surfactants having very long alkyl groups tend to be low foaming. It is believed that powdered extracts of yucca or soybean oil may also be suitable for use as the surfactant.

The amount of foaming of the composition depends on the mixing equipment and procedure, the amount and type of surfactant, and the amounts and types of other ingredients. For providing a cover at a landfill, preferably the composition is foamed 2 to 1 (2 volumes of air per 1 volume of composition ingredients including water). For use on soil to provide seed growth, preferably the composition is foamed 1 to 1. However, 3 to 1, 4 to 1 and other foaming ratios can also be used. Preferably the density of the foamed slurry is from about 3 to 6 pounds per gallon, more preferably from about 4 to 6 pounds per gallon, and most preferably from about 4.5 to 6 pounds per gallon. Lower densities result in poor application of the composition. Very low densities will not spray well. Higher densities reduce the coverage of the composition.

The self-foaming sprayable composition of the invention also includes a bulking material. When the composition is formed into an aqueous slurry and sprayed onto the material to be covered, the bulking material is the major ingredient of the resulting cover. After it hardens, the bulking material is water resistant and functions to preserve the cover. The bulking material is selected from bulking/setting materials, clay minerals, and mixtures thereof.

Examples of preferred bulking/setting materials include gypsum (calcium sulfate), fly ash, and other pozzolanic materials. With gypsum, typically the amount of material used is in the range of 30 to 350 pounds (per 100 gallons of water), and preferably between 35 and 300 pounds. With fly ash of the reactive type (which is preferred over the nonreactive type), typically 200 to 1200 pounds are used, and preferably between 500 and 900 pounds. With fly ash of the nonreactive type, larger amounts can be used, such as typically between 600 and 1400 pounds, and preferably between 800 and 1200 pounds. A bulking/setting material such as gypsum, fly ash or other pozzolanic material hardens, or "sets", independent of the surrounding conditions, which gives the resulting covering a drying advantage. The hardening of the bulking/setting material will occur under conditions of inclement weather such as light to moderate precipitation, and under all ambient temperature conditions.

A gypsum which has been successfully used is a hemi-hydrated calcium sulfate, commonly known as a #1 Molding Plaster, and available from U.S. Gypsum in Chicago, Ill. Another suitable gypsum is manufactured by National Gypsum. A preferred fly ash is a low sulfur coal derived fly ash from process flue gas.

Other bulking/setting materials can be used in large amounts similar to the above. For example, Portland cement, other cements, lime (calcium oxide), pot ash, silicates such as water glass, cement kiln dust, dolomite, marble, chalk, and other similar materials can be effectively utilized.

A clay mineral can also be used as the bulking material. Preferably the clay mineral is used in combination with a bulking/setting material such as gypsum. A very effective formulation of the self-foaming sprayable composition containing both clay mineral and gypsum includes the ingredients shown in the following Table 3.

TABLE 3

| Ingredient | Quantity |
|---|---|
| Foaming Agent | 0.45–0.9 pounds |
| Clay Mineral | 5–100 pounds |
| Gypsum | 5–300 pounds |
| Water Soluble Polymer | 1–12 pounds |
| Water | 100 gallons |

In addition to the above-described functions of the bulking material, the clay mineral also assists the water soluble polymer in absorbing water and enhancing the ability of the bulking/setting material to "wet set". The clay mineral further increases the foam integrity, and adds color to the composition. As known in the art, a clay mineral comprises a group of crystalline, finely divided earth materials generally considered to be hydrates of alumina and silica, with iron oxide and magnesia as common minor components. Preferably the clay mineral has a relatively small particle size, being in the range of 60 to 325 mesh size. The clay mineral is typically used in the range of 10 to 75 pounds (per 100 gallons of water) and preferably about 10 to 50 pounds.

A preferred clay mineral is a bentonite clay, an inert naturally occurring mineral that when in the presence of calcium metal cation absorbs little water and undergoes little dimensional expansion. The preferred bentonite clay is calcium bentonite, although sodium bentonite is also suitable. Bentonite clay consists of a particle size depending upon the crush size, and the particle does not break down with moderate mechanical action. A preferred bentonite clay is Barakade Bentonite manufactured by Barakade Corp., which comes in powdered form. Another suitable bentonite clay has a mesh size of 200 mesh and is available from NL Bariod Supplies.

Another preferred clay mineral is an attipulgite clay, an inert naturally occurring mineral composed of finely divided platelet crystals loosely bonded to adjoining platelets by weak, electrostatic charges resident on each platelet crystal. In the presence of calcium metal cations, the residual charge is neutralized and the aggregation of attipulgite clay particles is disrupted. This yields a free flowing, nonswelling, nonshrinking fill material of small physical dimensions. Typical types of attapulgite clay which have been successfully used include hectorite, saponite and sepcolite. A preferred attipulgite clay is Gel 601P which is available from NL Bariod Supplies.

Kaolin and montrnorillonite clays can also be used. Organically modified clays known as "organo clays" can also be used. An organo clay is a water soluble clay mineral which can absorb contaminants such as solvents and metals. The clay mineral can be a mixture of different clays. Other suppliers of clay minerals include American Colloid and IMV Division of Gulf Resources.

One or more water soluble polymers are used in the self-foaming sprayable composition. The polymers are selected to increase foam height integrity, increase water resistance, provide dust control, increase adhesion, provide structural integrity, allow "wet" setting, increase resistance to cracking, and to help the sprayed composition to bridge voids.

One preferred type of polymer is a cellulosic polymer. The cellulosic polymer is water soluble and binds together the covering by extending long polymer chains therethrough when wetted. One water soluble cellulosic polymer which has been successfully used in the composition is hydroxyethyl cellulose (HEC) polymer. The HEC polymer includes naturally occurring or synthetically produced repeating glucose units in long chains with hydrophilic substituent groups added to the polysaccharide chain to render the polymer miscible. In non-hydrated form, the polymer chains are folded into a pleated structure to form a very compact particle. In the presence of water, the polymer molecules bind with water molecules and the polymer chains unfold to form macromolecules which greatly exceed the original molecule size. Preferably, the HEC is an R treated type with a surface coating to slow the rate of molecule hydration to allow complete unfolding of the polymer chains. When the matrix is dry, the polymer chains provide strength and cohesion to the covering. The HEC polymer also increases the water resistance of covering, thereby (at least in the case of gypsum) decreasing the amount of bulking/setting material needed. The extended polymer chains would naturally refold as the covering dries, but are prevented from doing so due to the intertwining of the chains with the other ingredients of the composition.

A preferred HEC Polymer is Natrosol HHR-250, available from Hercules Inc. of Wilmington, Del., as are other Natrosol 250 polymers as well as Natrosol 150 and 300 polymers. Natrosol is produced in four levels of hydroxyethyl molar substitutes: 1.5, 1.8, 2.5 and 3.0, the polymers being designated 150, 180, 250 and 300, respectively.

Another water soluble polymer, such as a carboxymethyl cellulose (CMC) polymer, can be mixed with the HEC polymer. CMC is similar to the HEC polymer, but includes different hydrophilic substituent groups which both render the molecules water hydratable and cause the resulting molecules and polymer chains to be sticky or tacky. Thus, the CMC polymer causes the slurry to adhere to the surface being covered. This allows covering of slopes and generally vertical surfaces. The CMC bonding chain links are shorter but have a higher number in a specific area than the HEC polymer. The CMC polymer is also preferably an R treated type with a surface coating to slow the rate of hydration to allow complete unfolding of the polymer chains as macromolecules are formed. As the chains unfold, they become intertwined with the other ingredients of the composition. Similar to the HEC polymer, the chains would naturally refold as the covering dries, but are prevented from doing so due to the intertwining with the other composition ingredients.

Preferred CMC polymers are Culminal MC 25 and MC 60 which are available from the Aqualon Company, of Wilmington, Del. When both the HEC and CMC polymers are used, the HEC polymer primarily functions as a binder for the covering while the CMC polymer primarily imparts adhesiveness to the composition. When used together with gypsum, typically the amount of HEC polymer is equal to or slightly greater than the amount of CMC polymer.

The water soluble polymer can also include a superabsorbent polymer, particularly when fly ash is used in the composition instead of gypsum. A suitable superabsorbent polymer is a starch grafted polyacrylate such as Sanwet available from Hoechst Celanese. The superabsorbent is a highly absorbent polymer which can expand 20 to 100 times its dry size, and is capable of gelling 1000 times its weight in water. The superabsorbent polymer hydrates with water and causes the slurry to thicken to a uniform consistency, and enhances the suspension of the other components in the slurry.

Water forms the greatest part of the aqueous slurry, being approximately 65 to 85 percent of the slurry by weight. Water functions as the carrier for the ingredients and provides the mixing medium for combining the ingredients. As explained above, the water combines with the polymers to extend the binding chains. Once the slurry is applied, the majority of the water leaves the covering by evaporation.

While the carrier used herein is preferably water, it has been found desirable in some instances to use a carrier other than water, as disclosed in U.S. Pat. No. 5,082,500, all of which is herein incorporated by reference. For example, if the cover is to be applied to a refuse site containing organic material, the leachate which is collected at the site can be used as a carrier for the ingredients. It is believed that recycling the leachate into the site will enhance the natural microbial action which acts to reduce the volume of the organic material, while also eliminating the need to transport the leachate to a treatment plant.

The self-foaming sprayable composition can optionally include other ingredients. A highly preferred optional ingredient is a fibrous material. The fibrous material provides additional non-shrinking filler and a binder for the polymer matrix which adds mass and toughness to the resulting covering, and helps the covering bridge voids. Also, it has been found that the inclusion of shredded paper or other fibrous material greatly increases the foaming of the aqueous slurry made from the composition. It is believed that the fibrous material increases foaming by carrying a large volume of entrained air into the slurry. Usually at least about 10 pounds of fibrous material are added, preferably about 15 to 125 pounds, and more preferably about 20 to 90 pounds, per 100 gallons of water.

The fibrous material preferably comprises cellulose fibers, such as shredded paper formed from recycled newspapers. However, any small particles of paper including cardboard bag house material can be used. Under the mechanical agitation of the mixing process (described below), the paper fiber is loosened to form smaller fiber sizes of a random nature. Thus, any small grind of recycled newsprint will be satisfactory.

Wood fiber formed from shredding wood scraps and recycled wood products can also be used as an alternative or in addition to the paper fibers. Other suitable fibers include plastic fibers, glass fibers, paper sludge, fibers formed from rice paper, straw and textile fibers such as cotton linens. A combination of the various fibrous materials has been successfully used in the composition.

Another preferred optional ingredient is a retarder. In order to utilize larger volumes of slurry, a retarder can be included to slow the hardening of the bulking/setting material to allow adequate time for mixing and spraying the larger volume of slurry before the slurry hardens. With either gypsum or fly ash, it has been found that from 0.1 to 1.0 pound of a retarder (such as sodium citrate) per 100 gallons of water sufficiently delays the hardening of the bulking/setting material to allow coverage of a large surface area with a single batch of slurry.

The self-foaming sprayable composition by itself functions to repel pests of all types from the covered material, such as birds, animal pests, and insects. However, preferably the composition includes a pest control agent to increase its effectiveness in repelling pests. Any effective chemical aversion agent is suitable for use in this invention. Examples of chemical bird aversion agents include the anthranilates, esters of phenyl acetic acid, dimethyl benzyl carbinyl acetate, ortho amino benzoic acid derivatives, and cinnamic acid derivatives. Specific agents include: alpha-aminoacetophenone, ortho-hydroxyacetophenone, ortho-methoxyacetophenone, meta-methoxyacetophenone, para-methoxyacetophenone, 4-aminobenzoic acid, and 4-ketobenztriazine. Preferred chemical bird aversion agents include methyl anthranilate (MA) and dimethyl anthranilate (DMA), with MA being most preferred. MA and DMA are both manufactured by PMC Specialties. The composition can also include an animal repellent such as capsium for repelling rodent pests and the like, and/or any type of effective insect repellent.

Another preferred optional ingredient is a glue such as guar gum. The guar gum increases the adhesion properties and viscosity of the composition, and helps to control VOC's, odors, and blowing dust and litter. Also, the guar gum traps the chemical bird aversion agent in an effective matrix allowing a low evaporation rate and an effective dose rate. A preferred guar gum is Galactosol manufactured by Aqualon, Inc., an effective yet low cost material. It comes in powdered form, and has a surface coating which inhibits too rapid hydration.

For hydroseeding applications, seed and/or fertilizer can be added to the composition to provide a plant covering to retain the soil after the covering biodegrades.

A colorant such as a dye can be included in the composition to add an aesthetic quality of color. Proper selection and use of a color can cause the cover to blend in with the natural setting, thereby drawing less attention to the operation. Both brown and green alkali/acid based dyes have been used successfully. In addition, when the cover is applied to a refuse site, an odor control agent can be added to the composition. An anti-dust agent can be included to control dusting when the dry ingredients are being added to the water carrier.

A preferred self-foaming composition for covering refuse at a landfill includes the ingredients shown in the following Example 1. (A cover for remediation sites can be made from the same composition, except without the soda ash, guar gum and green dye.) The ingredients are given in pounds per 100 gallons of water.

EXAMPLE 1

| Ingredient | Quantity |
| --- | --- |
| Foaming Agent (Nacconal) | 0.54 pounds |
| Gypsum | 273 pounds |
| Bentonite Clay | 18 pounds |
| Attipulgite Clay | 3 pounds |
| Hydroxyethyl Cellulose | 3 pounds |
| Carboxymethyl Cellulose | 3 pounds |
| Sodium Citrate | 0.3 pounds |
| Soda Ash | 2.7 pounds |
| Guar Gum | 1.1 pounds |
| Green Dye | 0.1 pounds |
| Shredded Paper | 35 pounds |
| Water | 100 gallons |

Another preferred composition useful for covering both landfills and remediation sites includes the ingredients shown in the following Example 2:

EXAMPLE 2

| Ingredient | Quantity |
| --- | --- |
| Foaming Agent (Nacconal) | 0.54 pounds |
| Gypsum | 17 pounds |
| Bentonite Clay | 23 pounds |
| Hydroxyethyl Cellulose | 4.3 pounds |
| Carboxymethyl Cellulose | 1.9 pounds |
| Guar Gum | 1.9 pounds |
| Soda Ash | 1.9 pounds |
| Green Dye | 0.1 pounds |
| Shredded Paper | 35 pounds |
| Water | 100 gallons |

The composition shown in the following Example 3 is particularly useful for covering soil, as a means of providing erosion control and/or a means for distributing seeds and fertilizer over the soil.

EXAMPLE 3

| Ingredient | Quantity |
| --- | --- |
| Foaming Agent (Nacconal) | 0.54 pounds |
| Bentonite Clay | 18.4 pounds |
| Attipulgite Clay | 0.54 pounds |
| Hydroxyethyl Cellulose | 0.54 pounds |
| Guar Gum | 0.54 pounds |
| Shredded Paper | 14 pounds |
| Water | 100 gallons |

A very effective composition containing reactive fly ash is shown in the following Example 4

EXAMPLE 4

| Ingredient | Quantity |
| --- | --- |
| Foaming Agent (Nacconal) | 0.54 pounds |
| Power Plant Fly Ash | 900 pounds |
| Bentonite Clay | 50 pounds |
| Attipulgite Clay | 1.5 pounds |
| Hydroxyethyl Cellulose | 1.5 pounds |
| Shredded Paper | 50 pounds |
| Sodium Citrate | 0.5 pounds |
| Water | 100 gallons |

As described above, the ingredients of the self-foaming sprayable composition are usually in the form of a dry mix before combining with water. The ingredients are mixed with the water on site, typically in the mixing tank of a portable mixing apparatus. A preferred mixing apparatus includes a hydraulically powered, variable speed mixer fitted with multiple, medium pitched turbine mixing blades. In a preferred mixing procedure, the mixing tank is charged with water, usually about 500 gallons. All the ingredients except the shredded paper are added to the tank with continued mixing at medium speed. The ingredients are then mixed at high speed, usually for at least about 5 minutes. The shredded paper is then added with continued mixing at high speed, and the ingredients are mixed until a uniform slurry is formed, usually for at least about 5 minutes. In an alternative procedure, the shredded paper can be mixed with the water before the other ingredients. Optionally, a chemical bird aversion agent such as methyl anthranilate can be added and dispersed during the final mixing.

The foamed slurry is then ready for application, usually by spraying from a suitable apparatus. For example, the foamed slurry can be sprayed from a tank mixer out of a cannon (sprayable 75 to 200 feet), a hose reel (sprayable in tight, hard to reach places), or a spreader bar with spray jets. Suitable spraying apparatus is available from Finn, Bowie and other manufacturers. A positive displacement pump can be used to supply spray pressures typically between 100 psi and 150 psi. The foamed slurry can also be sprayed out of a manifold in long lines.

After spraying, the foamed slurry usually has a thickness of about 1/16 or 1/8 inch up to 2 to 3 inches. The thickness of the foam layer covering depends upon the amount of foamed slurry sprayed onto the surface being coated. A foam layer of 1/8 to 1/4 inch thick has been found to form a successful cover having a thickness of 1/16 to 1/8 inch thick after setting. The cover takes approximately one hour to set at an ambient temperature of 70° F. Setting occurs faster at a warmer ambient temperature and slower with a lower ambient temperature. However, the sprayed foamed slurry will function as a cover even when not set as the polymer matrix binds together the ingredients.

The composition and method of the present invention has been described in its preferred embodiments. However, it will be appreciated that modifications can be made to the preferred embodiments without departing from the scope of the attached claims.

What is claimed is:

1. A self-foaming composition comprising:
   (a) a foaming agent,
   (b) a bulking material,
   (c) a water soluble polymer, and
   (d) a glue,
the composition when mixed with an aqueous carrier forming a foamed sprayable aqueous slurry suitable for providing a cover layer over a selected material.

2. The composition defined in claim 1 wherein the self-foaming composition is in the form of a dry mix, and the foaming agent is a powdered foaming agent.

3. The composition defined in claim 2 wherein the glue is guar.

4. The composition defined in claim 2 additionally comprising a fibrous material.

5. The composition defined in claim 2 wherein the bulking material is selected from the group consisting of bulking/setting materials, clay minerals, and mixtures thereof.

6. The composition defined in claim 5 wherein the bulking material includes a bulking/setting material, and additionally comprising a retarder to slow the hardening of the bulking/setting material.

7. The composition defined in claim 2 wherein the foaming agent is a surfactant having a hydrophilic/lipophilic balance of at least about 11.0.

8. The composition defined in claim 2 wherein the amount of foaming agent is at least about 0.3 pounds per 100 gallons of aqueous carrier.

9. The composition defined in claim 2 wherein the composition, when mixed with the aqueous carrier, is foamed to a density from about 3 to about 6 pounds per gallon.

10. The composition defined in claim 2 wherein the foaming agent is a linear alkyl benzene sulfonate surfactant.

11. A method for providing a daily cover for waste material comprising:
   (a) depositing a layer of waste material at a site,
   (b) mixing a self-foaming composition comprising a foaming agent, a fibrous material, a binder and a glue with an aqueous carrier to form a foamed fibrous slurry, spraying the foamed fibrous slurry over the waste material, and allowing the foamed fibrous slurry to set up to form a cover layer over the waste material, and
   (c) repeating steps (a) and (b) during each operating day of the site.

12. The method defined in claim 11 wherein the self-foaming composition is in the form of a dry mix, and the foaming agent is a powdered foaming agent.

13. The method defined in claim 12 wherein the glue is guar.

14. The method defined in claim 12 wherein the fibrous material includes cellulosic fibers.

15. The method defined in claim 12 wherein the cover layer after setting has a thickness from about 1/16 inch to about 1 inch.

16. A method for providing a daily cover for waste material at a landfill site comprising:
   (a) depositing a layer of waste material at a landfill site,
   (b) mixing a self-foaming composition comprising a foaming agent, cellulosic fibers, a binder and a glue with an aqueous carrier to form a foamed fibrous slurry, hydro-spraying the foamed fibrous slurry over the waste material, and allowing the foamed fibrous slurry to set up to form a cover layer having a thickness from about 1/16 inch to about 1/2 inch over the waste material, and
   (c) repeating steps (a) and (b) during each operating day of the landfill site.

17. The method defined in claim 16 wherein the foaming agent is a surfactant having a hydrophilic/lipophilic balance of at least about 11.0.

18. The method defined in claim 16 wherein the amount of foaming agent is at least about 0.3 pounds per 100 gallons of aqueous carrier.

19. The method defined in claim 16 wherein the composition is foamed to a density from about 3 to about 6 pounds per gallon.

20. The method defined in claim 16 wherein the glue is guar.

* * * * *